Nov. 20, 1956
F. RETORNAZ
2,770,992
COPYING DEVICE FOR EXECUTING ARCUATE CUTS
IN A PLANE PASSING THROUGH THE AXIS
OF REVOLUTION OF A SLIDE LATHE
Filed Feb. 6, 1952
3 Sheets-Sheet 1
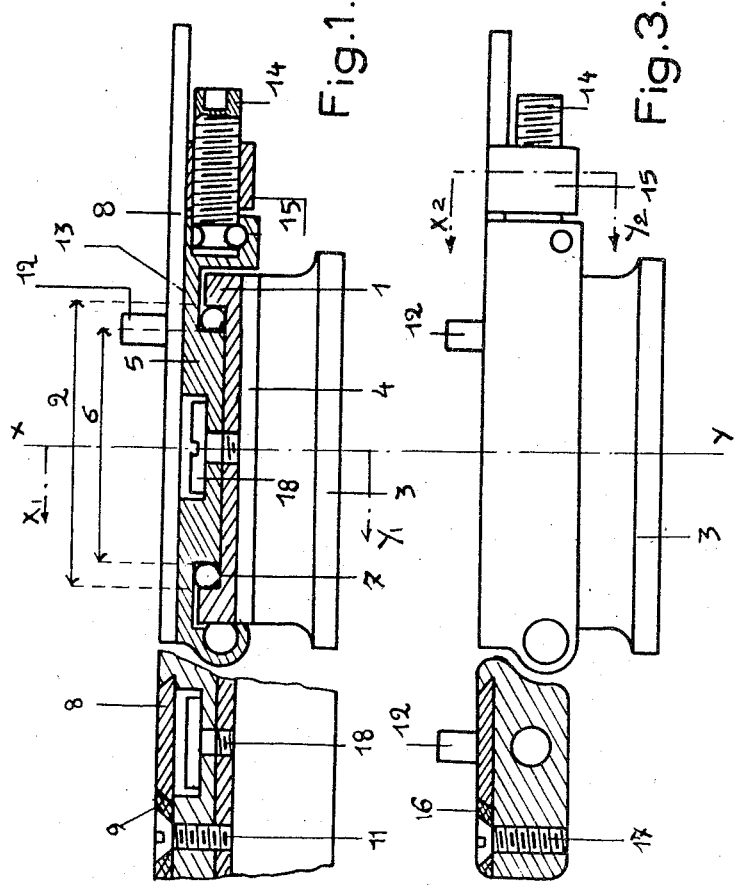
INVENTOR.
FRANCOIS RETORNAZ.
BY
ATTORNEYS.

INVENTOR.
FRANCOIS RETORNAZ.
BY
Chatroin & Company.
ATTORNEYS.

INVENTOR.
FRANCOIS RETORNAZ.
BY
ATTORNEYS.

United States Patent Office 2,770,992
Patented Nov. 20, 1956

2,770,992

COPYING DEVICE FOR EXECUTING ARCUATE CUTS IN A PLANE PASSING THROUGH THE AXIS OF REVOLUTION OF A SLIDE LATHE

Francois Retornaz, Marseille, France

Application February 6, 1952, Serial No. 270,248

Claims priority, application France January 29, 1951

2 Claims. (Cl. 82—11)

My invention has for its object a copying device adapted to execute arcuate cuts in a plane passing through the axis of revolution of a slide lathe for obtaining machined surfaces of various outlines.

According to my invention, it is possible to machine joining or the like surfaces and more particularly spherical surfaces and cylindrical surfaces having a circular generating line, the radii of said spherical surfaces or generating lines being comprised within a wide range.

The execution of such spherical surfaces allows using flat thrust bearings obtained in mass production in association with rotulas of an accurately calculated radius.

I have illustrated in accompanying diagrammatic drawings, by way of example and by no means in a restrictive sense, a preferred embodiment of a copying device in accordance with my invention. In said drawings:

Fig. 1 is a longitudinal cross-sectional view of the actual copying device.

Fig. 2 is a cross-sectional view thereof through line II—II of Fig. 1.

Fig. 3 is a front view of the same device.

Fig. 4 is a cross-section through line IV—IV of Fig. 3.

Figures 5, 6:
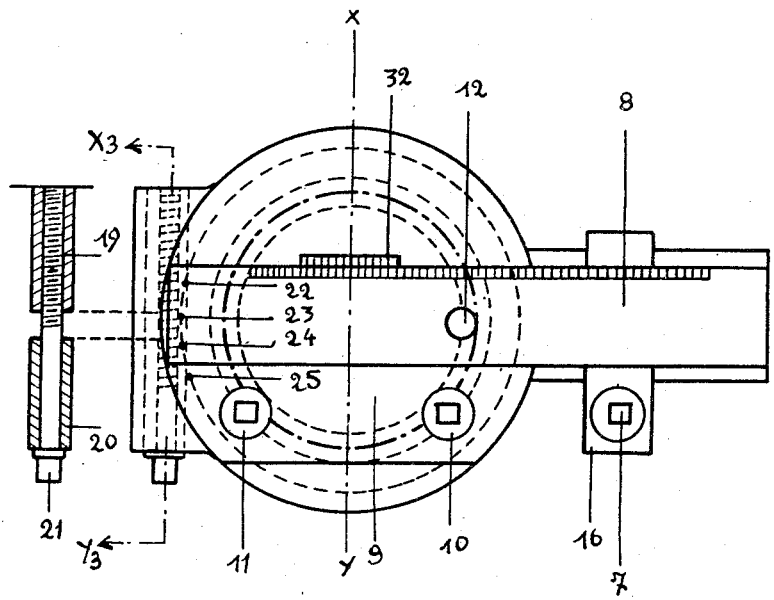
Fig. 5 is a plan view of the copying device.
Fig. 6 is a cross-section of the copying device through line VI—VI of Fig. 5.

The device illustrated in Fig. 1 includes a revoluble support provided with a bored recess 2 in its upper surface, said support being adapted to rotate through 360° together with a carrier member 4, the horizontal cross-section of which is circular, over the cylindrical bed-plate 3.

A further circular member 5, fitted over the revoluble support 1 includes a downwardly directed cylindrical axial projection 6 engaging the recess 2 in the support 1 with a slight clearance therebetween whereby it is possible to house between said projecting part 6 and the recess 2 a plurality of balls 7 to allow an easy rotation of the circular member 5 with reference to the support 1 with the interposition of said balls.

The upper part of the circular member 5 carries a sliding scale 8 adapted to be locked by a plate 9 engaging it transversely, which plate is held in place by the screws 10 and 11 (Fig. 3). The sliding scale 8 is provided axially with a spindle 12 rising vertically above it, which spindle controls, as disclosed hereinafter, the movements of the cutting tool.

The sliding scale may be shifted inside its slideway 13 either through direct actuation or through the agency of a worm gear the worm 14 of which is revolubly carried in a stop 15 adapted to be held fast over the slider through the plate 16 engaging the latter and secured to the stop by means of a screw 17 (Fig. 4). As the pitch of the worm 14 is very small, it allows a micrometric shifting of the scale, provided the screws 11 and 10 are not screwed down too tight and do not lock rigidly the sliding scale 8. The screw 18 (Fig. 2) engaging the support 1 limits the vertical shifting of the circular member 5 through abutment of its head against the bottom of a recess in said member.

The rotation of the circular member 5 over the support 1 may be prevented by the following arrangement disclosed merely by way of exemplification and including two locking cylinders 19 and 20 (Fig. 6) slidingly carried inside a cylindrical recess of the circular member 5 and adapted to move therein under the action of the hand-controlled worm 21. It is thus possible to make these cylinders clamp the outer surfaces of the support 1 by moving towards one another the wedge-shaped cylindrical terminal parts 22—23 and 24—25.

The operation of the arrangement is as follows, three movements being possible, to wit:

A circular movement of the system including the circular member 5 and the support 1 with reference to the bed-plate 3, said movement being provided through 360° round the axis X—Y;

The second movement is that of the circular member 5 with reference to the support 1 through an angle also of 360° round the axis X—Y, with the interposition of the balls 7 over which the member 5 revolves;

The third movement is that of the slider 8 adapted to execute longitudinal movements of a large magnitude when the stop 15 is not held fast or again a shifting of a very small magnitude exactly as is the case of a caliper scale when it is controlled by an adjusting screw.

The mechanism is comparable furthermore with that of such a caliper scale if the circular member 5 carrying the vernier 32 is considered as the slider jaw cooperating with the rule carrying the scale, constituted here by the sliding scale 8, and with the abutment 15 carrying the adjusting screw. The plate 9 and the screws 10 and 11 play the part of the fastening means of the slider 8 while the plate 16 and the screw 17 play the part of the adjusting screw acting on the abutment.

Figure 7:
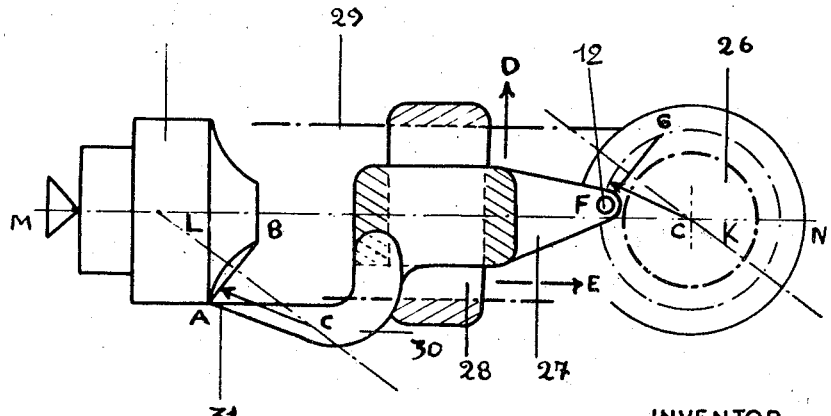
Fig. 7 is a general diagrammatic view of the arrangement of the copying device on the lathe.
Figures 8, 8A:
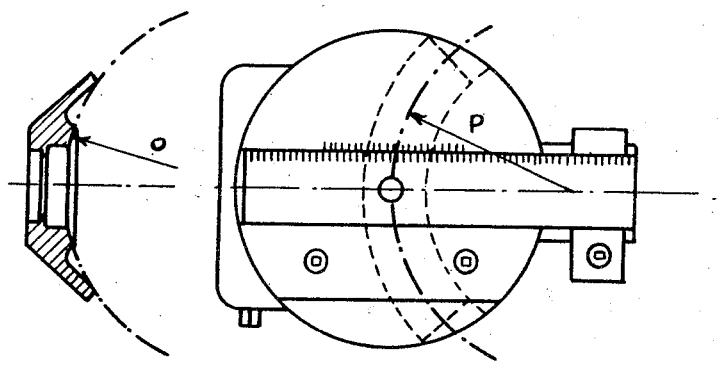
Figs. 8, 8a, 9, 9a, 10 and 10a illustrate the application of the device to the copying of a spherical surface.
Figures 9, 9A:
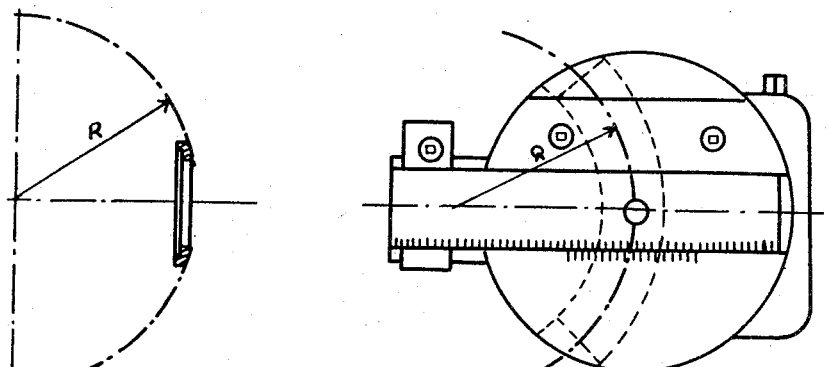

Under such circumstances and considering a member 33 (Fig. 7) on which it is desired to machine a cylindrical part the generating line of which AB is an arc of a circumference having as a radius C, said member is secured to the chuck of the lathe. The copying device 26 is secured on the other hand through suitable means to the bed-plate of the lathe. The tool carrier 27 acting on the part 33 is controlled by the copying device through the spindle 12 on the slider 8 of the latter and is carried on the transverse carriage 28 of the lathe which carriage is freely shiftable along the bed-plate 29. The tool carrier 27 is thus submitted to the action of the transverse control mechanism and, according to the case, the tool-carrier drives the transverse carrier or reversely. The tool 30 is located on the tool-carrier in a manner such that its tip 31 engages the point A of the member 33. The transverse carriage is driven together with the tool-carrier in the direction of the arrow D. The above-described combination of movements causes the spindle 12 to describe an arc FG round the axis of the copying device at a distance C therefrom while the tip of the tool 31 describes in its turn an arc of a circumference AB equal to FG. When the spindle 12 lies in the middle of the arc FG, the axis of the slider 8 forms with the axis of the lathe MN an angle K which is equal to L i. e. to the angle between a perpendicular to the chord AB and said axis of the lathe MN. As it is easy to calculate or to ascertain the value of L, it is possible thereby to define the corresponding medial position of the slider 8.

Figs. 8, 8a, 9, 9a illustrate the means for machining the spherical surfaces of the flanges of a speed-modifying device, said surfaces assuming a large radius O and also the machining of the supports of flat ball thrusts having a radius R. In these figures, the radii O—P—Q—R are all equal.

Figures 10, 10A:
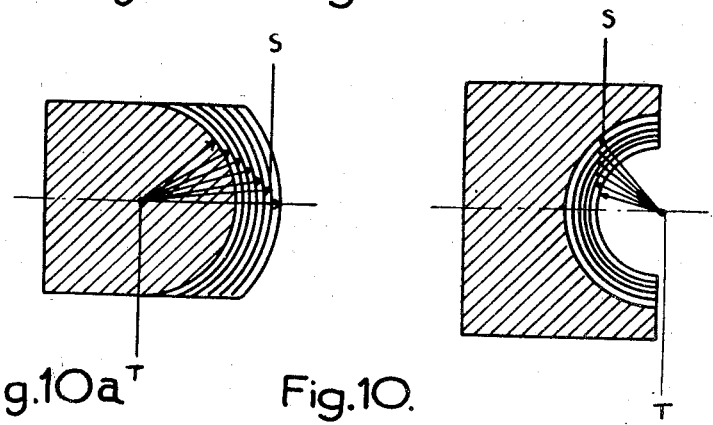

Figs. 10 and 10a illustrate the operation of the apparatus; the tip of the tool, whatever its wear may be, describes always a portion of a circumference that is identical with that described by the axis of the spindle on the slider. In the case of a male part TS, the radii decrease gradually while in the case of a female part ST, the radii increase gradually.

It is sufficient to record or to mark the subdivision on the slider 8 registering with the vernier 32. Through a mere rotation of the slider 8 with the support 1 through 180°, it is possible to obtain radii in the machined surface that are of equal values in both cases but correspond respectively to hollow and relief operation.

Obviously the shape, size and arrangement of the different elements described and the material used for their execution may vary without modifying the general design of the device disclosed and claimed in accompanying claims.

It should be mentioned that the assembling of the various members allows obtaining varied outlines and operations, ranging between the truing of cylindrical and spherical surfaces and the obtention of conical surfaces.

What I claim is:

1. A copying device for coupling to the usual tool holder of a lathe for constraining the tool to produce arcuate cuts in a work piece in the horizontal plane passing through the axis of revolution of a slide lathe, comprising a stationary bed plate adapted to be secured to the bed of the lathe, a first member carried by the bed plate and adapted to revolve thereon about an axis perpendicular to the axis of the lathe and passing through said last-mentioned axis, a second member revolvably and coaxially mounted on the first member, said second member being provided on its surface remote from the first member with a diametrical slideway, means for adjusting the relative angular position of the two members, a rule slidably carried in the slideway, a releasable clamping plate carried on the second member and adapted to engage longitudinally along one edge of the rule parallel to its direction of movement to clamp the rule in fixed position in the slideway, a block adjustably carried by the rule and having a threaded bore the axis of which is parallel to the plane of the rule, a worm carried by the second member and engaged in said bore, said worm being rotatable with respect to the second member but prevented from axial movement with respect thereto, an upstanding spindle carried on the rule, and a link pivotably connecting the spindle to the usual tool holder to constrain the tool holder and tool, when actuated by the usual cross and axial feed means, to follow the movement of the spindle as determined by the position of the rule with respect to the axis of the lathe.

2. In a lathe the combination of a mandrel, a tool holder and a tool therein, means for shifting the tool holder longitudinally and transversely with reference to the axis of revolution of the mandrel, and a copying device for constraining the tool to produce arcuate cuts in the work piece in the horizontal plane passing through the axis of revolution of the lathe, said copying device including a stationary bed plate secured to the bed of the lathe, a member carried thereon and adapted to revolve about an axis perpendicular to and passing through the axis of the lathe, said member being provided in its upper surface with a diametrical slideway, a rule slidably carried in the slideway, a releasable clamping plate carried on the member and adapted to engage longitudinally along one end of the rule parallel to the direction of movement thereof to clamp the rule in fixed position in the slideway, a block adjustably carried by the rule and having a threaded bore the axis of which is parallel to the plane of the rule, a worm carried by the member and engaged in said bore, said worm being rotatable with respect to the member but prevented from axial movement with respect thereto, an upstanding spindle carried on the rule, and a link member pivotably connected between the spindle and the tool holder whereby, upon operation of the longitudinal and transverse shifting means, the tool is constrained to follow movements of the spindle determined by the sliding of the rule in its slideway and the rotation of the member.

References Cited in the file of this patent

UNITED STATES PATENTS

| 1,433,605 | Dross | Oct. 31, 1922 |
| 1,485,258 | Dzus | Feb. 26, 1924 |
| 2,104,238 | Nichols | Jan. 4, 1938 |
| 2,465,393 | Obadiah | Mar. 29, 1949 |
| 2,470,097 | Goulette | May 17, 1949 |
| 2,674,144 | Lalanne | Apr. 6, 1954 |

FOREIGN PATENTS

| 608,453 | France | Dec. 29, 1925 |

OTHER REFERENCES

American Machinist, Sept. 6, 1917, page 431.